(12) United States Patent
Vertanen

(10) Patent No.: US 9,571,023 B2
(45) Date of Patent: Feb. 14, 2017

(54) SYNCHRONIZING AN INVERTER WITH AN ALTERNATING VOLTAGE SOURCE

(75) Inventor: Mikko Vertanen, Espoo (FI)

(73) Assignee: ABB Technology Oy, Helsinki (FI)

( * ) Notice: Subject to any disclaimer, the term of this patent is extended or adjusted under 35 U.S.C. 154(b) by 1432 days.

(21) Appl. No.: 12/694,918

(22) Filed: Jan. 27, 2010

(65) Prior Publication Data

US 2010/0188122 A1     Jul. 29, 2010

(30) Foreign Application Priority Data

Jan. 28, 2009   (EP) .................................... 09151515

(51) Int. Cl.
*H02P 6/18*      (2016.01)
*H02P 9/10*      (2006.01)

(52) U.S. Cl.
CPC ............. *H02P 9/102* (2013.01); *H02P 21/22* (2016.02)

(58) Field of Classification Search
USPC ................................. 318/437; 327/100, 141
See application file for complete search history.

(56) References Cited

U.S. PATENT DOCUMENTS

| | | | |
|---|---|---|---|
| 7,193,383 B2 * | 3/2007 | Sarlioglu et al. ............. | 318/438 |
| 7,230,399 B2 * | 6/2007 | Kuribayashi et al. ........ | 318/434 |
| 8,278,859 B2 * | 10/2012 | Sakai et al. .............. | 318/400.32 |
| 2003/0030406 A1 * | 2/2003 | Takahashi et al. ........... | 318/714 |
| 2004/0109273 A1 * | 6/2004 | Honda et al. ................... | 361/90 |
| 2004/0120172 A1 * | 6/2004 | Heikkila et al. .............. | 363/132 |
| 2004/0130283 A1 | 7/2004 | Kuribayashi et al. | |
| 2005/0218862 A1 * | 10/2005 | Huggett et al. ............... | 318/722 |
| 2006/0108967 A1 * | 5/2006 | Tanaka et al. ................ | 318/712 |
| 2007/0007922 A1 | 1/2007 | Sarlioglu et al. | |
| 2007/0216344 A1 * | 9/2007 | Welchko et al. ............. | 318/811 |
| 2008/0049470 A1 * | 2/2008 | Ishio et al. ....................... | 363/78 |
| 2008/0224651 A1 * | 9/2008 | Schulz et al. ................ | 318/812 |
| 2009/0232687 A1 * | 9/2009 | Tanaka et al. .................... | 418/1 |
| 2011/0266987 A1 * | 11/2011 | Markunas et al. ........ | 318/400.24 |
| 2013/0009587 A1 * | 1/2013 | Yabuguchi et al. .......... | 318/561 |

FOREIGN PATENT DOCUMENTS

| | | | | |
|---|---|---|---|---|
| EP | 1 424 764 A2 | 6/2004 | | |
| EP | 1 742 347 A2 | 1/2007 | | |
| JP | 63240392 A | * | 10/1988 | ............... H02P 6/02 |
| JP | 2007189825 A | * | 7/2007 | |
| JP | 2007-236015 A | 9/2007 | | |
| JP | 2007-244009 A | 9/2007 | | |
| JP | 2009136129 A | * | 6/2009 | |

OTHER PUBLICATIONS

European Search Report of Application No. 09151515.5 Jun. 26, 2009.

* cited by examiner

*Primary Examiner* — Kawing Chan
(74) *Attorney, Agent, or Firm* — Taft Stettinius & Hollister LLP

(57) ABSTRACT

A method and device are disclosed for synchronizing an inverter with an alternating voltage source. The method includes measuring a current generated by the alternating voltage source and flowing through diodes of the inverter, determining a phase angle and angular velocity relating to the alternating voltage source from the measured current for enabling synchronization between the inverter and the alternating voltage source, and starting modulation of the inverter according to the obtained phase angle and angular velocity.

6 Claims, 1 Drawing Sheet

SYNCHRONIZING AN INVERTER WITH AN ALTERNATING VOLTAGE SOURCE

RELATED APPLICATION

This application claims priority under 35 U.S.C. §119 to European Patent Application No. 09151515.5 filed in Europe on Jan. 28, 2009, the entire content of which is hereby incorporated by reference in its entirety.

FIELD

Exemplary embodiments are directed to detecting properties of an alternating voltage source, and to synchronizing an inverter with an alternating voltage source.

BACKGROUND INFORMATION

A frequency converter is an electrical apparatus that can be used for controlling a rotating electrical machine. For the control, the frequency converter can be synchronized with the machine such that the frequency converter knows the electrical properties of the machine. These electrical properties include the rotational direction and rotational speed of the controlled machine.

In a frequency converter, the part controlling the load is an inverter. The inverter can include output switches with which a desired voltage is switched to the load. Freewheeling diodes are connected antiparallel to each output switch to enable a flow of currents in the load phases.

A frequency converter also can include an input bridge which converts an AC input voltage to a DC voltage from which the output switches for an alternating voltage to the load. A diode bridge is a known structure of the input bridge. Some frequency converters are equipped with a possibility to transfer electrical energy back to the supplying network. These line converters are basically similar to the inverters having active switch components and diodes connected antiparallel with the active components. As with the inverters controlling the load, the line converters can be synchronized with the rotating voltage source (e.g., the supplying network).

In some cases, the inverter is not synchronized with a rotating voltage source. This may be the case when, for example, the line converter is connected to the supplying network or when the network returns after a failure in the supplying network. Similarly, when the inverter controlling a rotating machine loses the synchronization or is connected to a rotating machine, the inverter should obtain knowledge of the electrical properties of the rotating load before it may start the modulation of the switches. If the rotating load is a permanent magnet synchronous machine, the load acts as a generator and provides power to the intermediate circuit of the frequency converter via the diodes of the inverter bridge if the rotational speed of the machine is high enough to produce a voltage which is higher than the voltage of the supplying mains.

The synchronization to the rotating voltage source can be achieved by known methods, which include a zero-current control and a short circuit pulse method. In the zero-current control, a zero current is set to target for the current controller of the inverter. Once no current flows between the inverter and the rotating load, the voltage of the inverter corresponds to the voltage of the load and synchronization is obtained. With zero-current control, the current controller should be quite fast to avoid a large current pulse at the beginning of the method. The short circuit pulse method can be inaccurate when the method is based on few test pulses only.

When the rotational speed and thus the motion voltage are higher, currents can change faster. Especially a short circuit pulse test is disturbed once the machine is in a field weakening region when a motion voltage generated by the machine is at the same level as the voltage of a DC bus of the frequency converter. Due to a low level of the DC bus voltage, a current vector which occurs during the zero voltage does not fade away quickly when the inverter stops modulating.

SUMMARY

A method is disclosed of synchronizing an inverter with an alternating voltage source, comprising measuring a current generated by the alternating voltage source and flowing through diodes of the inverter, determining a phase angle and angular velocity relating to the alternating voltage source from the measured current for synchronizing the inverter and the alternating voltage source, and initiating modulation of the inverter using the phase angle and angular velocity.

An inverter is disclosed, comprising means for measuring a current generated by an alternating voltage source for flow through diodes of the inverter, means for determining a phase angle and angular velocity relating to the alternating voltage source from the measured current for synchronizing the inverter and the alternating voltage source, and means for initiating modulation of the inverter using the phase angle and angular velocity.

A computer readable medium is disclosed which contains a computer program code, wherein execution of the program code in a computer causes the computer to implement a method of synchronizing an inverter with an alternating voltage, the method comprising measuring a current generated by the alternating voltage source and flowing through diodes of the inverter, determining a phase angle and angular velocity relating to the alternating voltage source from the measured current for synchronizing the inverter and the alternating voltage source, and initiating modulation of the inverter using the phase angle and angular velocity.

BRIEF DESCRIPTION OF THE DRAWINGS

In the following, objects and advantages of the disclosure will be described in greater detail with reference to exemplary embodiments and the accompanying drawings, in which.

DETAILED DESCRIPTION

A method and apparatus are disclosed for synchronizing an inverter and an alternating voltage source.

When an inverter is connected to an alternating voltage source, such as a permanent magnet synchronous machine or a supplying network, and the inverter is not modulating, the inverter can still draw a small current through diodes arranged in parallel with controllable switches. The inverter can use a small current and power for the operation of peripheral circuits. Although the power taken by these circuits is small, the current has a measurable magnitude, which can be used as a basis for the synchronization as disclosed herein.

Exemplary embodiments can reliably determine the properties of rotation. Further, the rotational state can be determined fast before the modulation of the inverter is initiated, or started. Thus, when the modulation is started, the orientation of the alternating voltage source is known and there are no risks relating to overcurrents.

Figure 1:
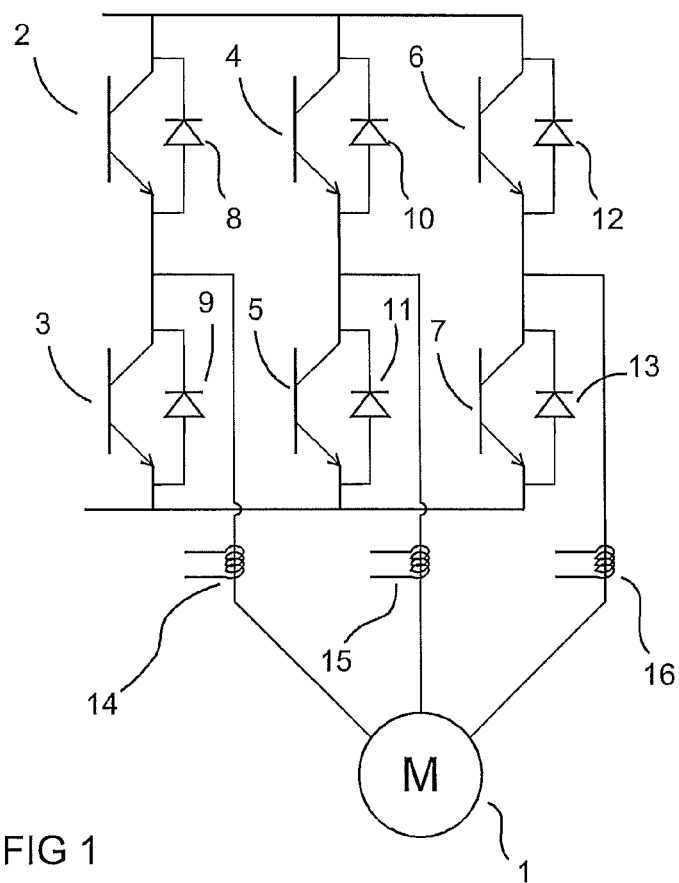
FIG. 1 shows a basic structure of an exemplary inverter connected to an alternating voltage source.

FIG. 1 shows an exemplary inverter bridge connected to a permanent magnet synchronous machine 1. The inverter bridge includes controllable switch components 2, 3, 4, 5, 6, 7 enabling a voltage of positive and negative bus bars to be connected to the machine 1. FIG. 1 shows parallel diodes 8, 9, 10, 11, 12, 13, also known as free-wheeling diodes, which are connected anti-parallelly with the controllable switch components.

When the permanent magnet machine 1 rotates freely, for example driven by its load, the machine generates a voltage and acts as a generator. The amplitude of the generated voltage depends on the rotational speed of the machine such that the faster the machine rotates, the higher the amplitude of the generated voltage.

Once the phase-to-phase amplitude of the generated voltage exceeds the voltage of the intermediate voltage circuit (e.g., the potential difference between the positive and negative bus bars), current may flow from the machine to an intermediate voltage circuit through the diodes arranged in parallel with the switches.

The intermediate voltage circuit may be completely without voltage when, for example, a rectifier of a frequency converter is not yet connected to a supplying network or when the machine is a generator supplying the voltage to the intermediate voltage source and the inverter is not modulating. In some situations, the permanent magnet machine may also be rotating without control (i.e. the inverter is not modulating) in the field weakening region. In this region, the machine rotates above its rated speed and provides a voltage with an amplitude exceeding the nominal voltage of the intermediate voltage circuit. Thus, even if the intermediate voltage circuit is fully charged, the voltage generated by the permanent magnet machine may exceed this voltage if the rotational speed of the machine is high enough.

When the inverter is not modulating (e.g., the active switch components are not controlled), the inverter takes a small amount of power from the intermediate voltage circuit. The power used by these auxiliary circuits can be fed through the diodes 8, 9, 10, 11, 12, 13 when the amplitude of the generated voltage forward biases the diodes. Such auxiliary circuits using power are, for example, auxiliary power supplies for driving the controlled switches.

According to the present disclosure, the current generated by the alternating voltage source flowing through the diodes of the inverter is measured. In FIG. 1, the measurement is carried out by current transducers 14, 15, 16 arranged to measure currents flowing in the phases of the machine. These transducers can be operated to measure the current of the inverter bridge. Although three transducers are presented in FIG. 1, the diode current can be measured using only two transducers since the currents in the system return to the voltage source through the same diode bridge.

According to a method of the disclosure, the phase angle and the angular velocity relating to the alternating voltage source can be determined from the measured current. The determined phase angle and angular velocity relating to the alternating voltage source are such that synchronization between the inverter and the alternating voltage source is enabled. The phase angle and the angular velocity may be, for example, properties of the voltage of the alternating voltage source or properties of a magnetic flux that are determined on the basis of the measured diode currents.

Figure 2:
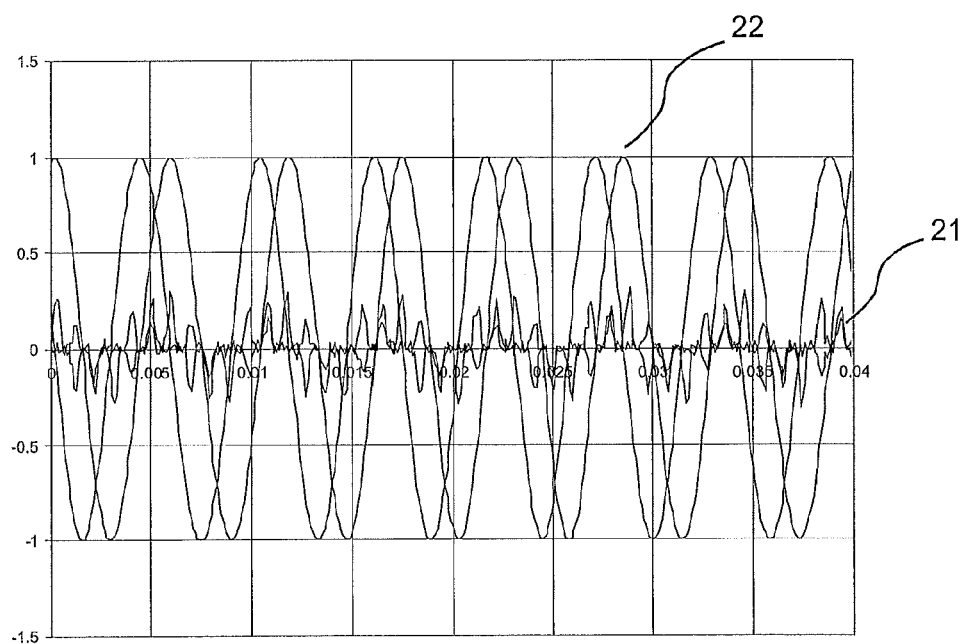
FIG. 2 shows an exemplary measured diode current and a unit vector estimated in a manner as disclosed herein.

The measured diode currents have a low amplitude and they contain lots of harmonics. FIG. 2 illustrates exemplary measured diode currents 21 in x- and y-component form. The diode currents are shown as per unit values and are multiplied by 10. The amplitude of the diode current is inversely proportional to the rotational speed of the machine and directly proportional to the need of auxiliary power.

According to an exemplary embodiment, a unit vector having a direction of the fundamental wave of the diode current is estimated using a phase locked loop. This unit vector is defined as:

$$e_{i1}=e_{i1x}+je_{i1y} \qquad (1)$$

in orthogonal x- and y-components.

An instantaneous phase angle of the measured diode current vector is:

$$\theta_i = \arctan\left(\frac{i_{sy}}{i_{sx}}\right) \qquad (2)$$

where $i_{sy}$ and $i_{sx}$ are y- and x-components of the measured diode current vector. The instantaneous unit vector in the direction of the diode current vector is:

$$e_i = e_{ix}+je_{iy}=\cos(\theta_i)+j\sin(\theta_i). \qquad (3)$$

For the phase locked loop, an error variable $\tilde{\theta}$ is defined as a difference between the phase angle $\theta_{i1}$ of the defined unit vector and the phase angle $\theta_i$ of the measured diode current vector as:

$$\tilde{\theta}=\theta_{i1}-\theta_i\approx\sin(\hat{\theta}_{i1}-\theta_i)=\hat{e}_{i1}\times e_i=\hat{e}_{i1x}e_{iy}-\hat{e}_{i1y}e_{ix}. \qquad (4)$$

The unit vector according to (1) can be calculated by turning the vector at each calculation step by an angle $\Delta t\hat{\omega}_{i1}$:

$$\hat{e}_{i1}(T) = \hat{e}_{i1}(T-1)e^{j\Delta t\hat{\omega}_{i1}} \qquad (5)$$
$$= e_{i1}(T-1)(\cos(\Delta t\hat{\omega}_{i1}) + j\sin(\Delta t\hat{\omega}_{i1})),$$

where an angular frequency estimate $\hat{\omega}_{i1}$ for the unit vector is obtained from an output of a PI controller (6) when the error variable of (4) is controlled to zero:

$$\hat{\omega}_{i1}=k_p\tilde{\theta}+k_i\int\tilde{\theta}dt \qquad (6)$$

where constants $k_i$ and $k_p$ are the controller's gains.

In equation (5) the estimated direction of the unit vector is calculated at time instant T by turning the previous unit vector calculated at time instant T−1, and $\Delta t$ is the time difference between the two successive calculations. The phase angle of the diode current can be determined directly from the unit vector of equation (5).

Thus, the above procedure forms a unit vector which is controlled to the direction of the fundamental wave of the diode current. The phase angle and angular frequency of the unit vector are determined. These both values correspond to the phase angle and angular frequency of the diode current.

With the above procedure, the instantaneous direction of the diode current vector can be determined. Some inverter control principles are based on the magnetic flux of the machine, and thus the synchronization between the inverter and the machine involves information about the magnetic flux. Since the current drawn by the auxiliary circuits of the inverter or frequency converter is near an effective current (e.g., the current has the direction of the voltage), the magnetic flux of a permanent magnet machine leads the current by 90 degrees. Thus, the direction and rotational speed of the magnetic flux of the machine can be determined. FIG. 2 shows the pulsed diode currents 21 and the unit vector 22 calculated by the above described method. The unit vector 22 is shown in x- and y-components.

The above procedure is also applicable when the alternating voltage source is a supplying network. In such a case, the inverter can be referred to as a line converter. When considering the structure of FIG. 1 as a line converter, the machine 1 is substituted by an alternating mains voltage but otherwise the structure is the same. The synchronization can be made with the voltage of the mains, which has the same orientation as the diode current.

Another possibility for obtaining the phase angle and angular velocity from the measured diode current is to use Fourier analysis on the measured current. By using, for example, FFT (fast Fourier transform) algorithm on the diode current 21 shown in FIG. 2, the frequency, amplitude and phase angle of the fundamental wave can be obtained. The obtained frequency and phase angle can be used for determining the frequency and phase angle of the alternating voltage and further the frequency and phase angle of the magnetic flux.

The method disclosed herein can, for example, be implemented in an inverter or a frequency converter. These apparatuses can include data processing capacity and therefore are suitable for carrying out the method. The measured currents are fed to the control system or the like having processing capacity when (e.g., as soon as) the orientation of the alternating voltage supply is determined according to the disclosure, the control system can initialize the inverter to start the modulation with the correct switch combination.

Exemplary embodiments can be implemented by means of a computer or corresponding digital signal processing equipment can be provided with suitable software, for example. Such a computer or digital signal processing equipment can include, for example, at least a working memory (RAM) providing storage area for arithmetical operations and a central processing unit (CPU), such as a general-purpose digital signal processor. The CPU can include a set of registers, an arithmetic logic unit, and a control unit. The control unit is controlled by a sequence of program instructions transferred to the CPU from the RAM. The control unit may contain a number of microinstructions for basic operations. The implementation of the microinstructions may vary depending on the CPU design. The program instructions may be coded by a programming language, which may be a high-level programming language, such as C, Java, and so forth, or a low-level programming language, such as a machine language, or an assembler. The computer may also have an operating system which may provide system services to a computer program written with the program instructions. The computer, inverter or other apparatus implementing the disclosure can include suitable input means for receiving data (e.g., measurement and/or control data), which input means thus enable monitoring (e.g., the monitoring of current and voltage quantities), and output means for outputting information (e.g. fault alarms and/or control data) for use in, for example controlling the switches of the inverter. It is also possible to use a specific integrated circuit or circuits, and/or discrete components and devices for implementing the functionality according to any one of the embodiments.

Exemplary embodiments can be implemented in existing system elements, such as inverters, frequency converters or similar devices. Present inverter equipment can include processors and memory that can be utilized in the functions according to embodiments of the disclosure. Thus, all modifications and configurations for implementing an embodiment of the disclosure (e.g., in existing inverters) may be performed as software routines, which may be implemented as added or updated software routines. If the functionality of the disclosure is implemented by software, such software can be provided as a computer program product having computer program code which, when run on a computer, causes the computer or a corresponding arrangement to perform the functionality according to the disclosure as described above. Such a computer program code may be stored or generally embodied on a computer readable medium, such as suitable memory (e.g., a flash memory or a disc memory) from which it is loadable to the unit or units executing the program code. In addition, such a computer program code implementing the disclosure may be loaded to the unit or units executing the computer program code via a suitable data network, for example, and it may replace or update a possibly existing program code.

As technology advances, exemplary embodiments can be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of synchronizing an inverter with an alternating voltage source, the method comprising:
   measuring a current generated by the alternating voltage source and flowing through diodes of the inverter when the inverter is not modulating and when the phase-to-phase amplitude of the generated voltage exceeds the voltage of an intermediate voltage source;
   determining a phase angle and angular velocity relating to the alternating voltage source from the measured current for synchronizing the inverter and the alternating voltage source; and
   initiating modulation of the inverter using the phase angle and angular velocity.

2. A method according to claim 1, comprising:
   determining a unit vector rotating in synchronism with a fundamental wave of the measured current flowing through the diodes; and
   determining the phase angle and angular velocity using the determined unit vector.

3. A method according to claim 1, comprising:
   defining a unit vector;
   defining an error variable as a difference between a phase angle of the unit vector and the phase angle of the measured current flowing through the diodes;
   controlling the error variable to zero to obtain an angular velocity estimate of the unit vector;
   turning the unit vector with an angle which is calculated at a given time instant;

determining the phase angle of the current flowing through the diodes from the phase angle of the unit vector; and determining angular velocity of the current flowing through the diodes from an angular velocity of the unit vector.

4. A method according to claim 1, comprising:

determining the phase angle and the angular velocity using Fourier analysis of the measured current flowing through the diodes.

5. An inverter, comprising:

means for measuring a current generated by an alternating voltage source for flowing through diodes of the inverter when the inverter is not modulating and when the phase-to-phase amplitude of the generated voltage exceeds the voltage of an intermediate voltage source;

means for determining a phase angle and angular velocity relating to the alternating voltage source from the measured current for synchronizing the inverter and the alternating voltage source; and means for initiating modulation of the inverter using the phase angle and angular velocity.

6. A non-transitory computer readable medium having a computer program recorded thereon, wherein execution of the computer program in a computer causes the computer to implement a method of synchronizing an inverter with an alternating voltage, the method comprising:

measuring a current generated by the alternating voltage source and flowing through diodes of the inverter when the inverter is not modulating and when the phase-to-phase amplitude of the generated voltage exceeds the voltage of an intermediate voltage source;

determining a phase angle and angular velocity relating to the alternating voltage source from the measured current for synchronizing the inverter and the alternating voltage source; and initiating modulation of the inverter using the phase angle and angular velocity.

\* \* \* \* \*